(12) United States Patent
Harada et al.

(10) Patent No.: US 7,704,058 B2
(45) Date of Patent: Apr. 27, 2010

(54) PISTON PUMP

(75) Inventors: Tomoo Harada, Anjo (JP); Junichi Maeda, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 337 days.

(21) Appl. No.: 11/832,072

(22) Filed: Aug. 1, 2007

(65) Prior Publication Data

US 2008/0031754 A1 Feb. 7, 2008

(30) Foreign Application Priority Data

Aug. 7, 2006 (JP) ............... 2006-214151
May 31, 2007 (JP) ............... 2007-144892

(51) Int. Cl.
*F04B 53/12* (2006.01)

(52) U.S. Cl. ..................... 417/549

(58) Field of Classification Search ............ 92/249; 417/470, 549, 555.1
See application file for complete search history.

(56) References Cited

U.S. PATENT DOCUMENTS

| 3,678,809 A * | 7/1972 | Doutt .................. 92/86 |
| 4,089,533 A * | 5/1978 | Knudson .................. 277/436 |
| 5,823,639 A | 10/1998 | Zinnkann et al. |
| 6,171,083 B1 * | 1/2001 | Schuller .................. 417/549 |
| 6,302,663 B1 * | 10/2001 | Schuller et al. ............ 417/554 |
| 6,652,245 B2 * | 11/2003 | Hauser et al. ............... 417/313 |
| 6,957,605 B1 * | 10/2005 | Blume .................. 92/240 |
| 2001/0002978 A1 * | 6/2001 | Siegel et al. ............ 417/470 |
| 2005/0063846 A1 * | 3/2005 | Maeda .................. 417/471 |
| 2005/0074348 A1 * | 4/2005 | Maeda et al. ............... 417/471 |

FOREIGN PATENT DOCUMENTS

JP 9-506690 A 6/1997

* cited by examiner

*Primary Examiner*—Devon C Kramer
*Assistant Examiner*—Bryan Lettman
(74) *Attorney, Agent, or Firm*—Buchanan Ingersoll & Rooney PC

(57) ABSTRACT

A piston pump including a pump housing, a piston provided at the inner bore of the pump housing and assembled with an annular sealing member to form a pump chamber. The piston is configured to slide at an inner wall of the inner bore. The annular sealing member is assembled with the piston so as to slide at the inner wall of the inner bore in the axial direction together with the piston. And a first sliding range of the piston relative to the inner wall of the inner bore and a second sliding range of the annular sealing member relative to the inner wall of the inner bore do not overlap each other in the axial direction.

2 Claims, 4 Drawing Sheets

PISTON PUMP

CROSS REFERENCE TO RELATED APPLICATIONS

This application is based on and claims priority under 35 U.S.C. §119 to Japanese Patent Application No. 2006-214151, filed on Aug. 7, 2006 and Japanese Patent Application No. 2007-144892, filed on May 31, 2007 the entire content of which are incorporated herein by reference.

FIELD OF THE INVENTION

The present invention relates to a piston pump.

BACKGROUND

A known piston pump disclosed in JP09-506690A (corresponding to U.S. Pat. No. 5,823,639) includes a pump housing having an inlet port, an outlet port, and an inner bore being in communication with the inlet port and the outlet port. The piston pump also includes a piston which is assembled at the inner bore of the pump housing and assembled with an annular sealing member to form a pump chamber increasing and decreasing volume by reciprocation of the piston in an axial direction. The piston pump further includes an inlet valve provided at an inlet passage which establishes the communication between the inlet port and the pump chamber. The inlet valve is configured to open when the volume of the pump chamber is increased and to close when the volume of the pump chamber is decreased. The piston pump still further includes an outlet valve provided at an outlet passage which establishes the communication between the outlet port and the pump chamber. The outlet valve is configured to open when the volume of the pump chamber is decreased and to close when the volume of the pump chamber is increased. The known piston pump is configured so that a fluid can flow from the inlet port into the outlet port following an increase and a decrease of the volume of the pump chamber by the reciprocation of the piston in an axial direction. With the construction of the known piston pump, the piston is configured to slide on an inner wall of the inner bore, and the annular sealing member is assembled at the piston so as to slide on the inner wall of the inner bore in the axial direction together with the piston.

The known piston pump disclosed in JP09-506690A includes the annular sealing member assembled on the inner bore of the pump housing together with the piston to form the pump chamber. According to the known piston pump, a sliding range of the annular sealing member relative to the inner wall of the inner bore and a sliding range of the piston relative to the inner wall of the inner bore are overlapped in an axial direction. Thus, when scratches are produced on the inner wall of the inner bore in response to the sliding movements of the piston, a sliding portion of the sealing member has to slide on the scratch, and the sliding portion of the sealing member is likely to be damaged by the scratches, which may impair durability of the sealing member.

Further, with a construction that the entire sealing portion of the sealing member slides on the scratches in a state where the sliding range of the sealing member and the sliding range of the piston are overlapped in the axial direction, the entire sealing portion of the sealing member is possibly damaged. This brings the early loss in the sealing function of the sealing member.

A need thus exists for a piston pump, which limits the damage on a sealing member even when scratches are formed on an inner wall of an inner bore in response to a sliding movement of a piston.

SUMMARY OF THE INVENTION

In light of the foregoing, the present invention provides a piston pump, which includes a pump housing including an inlet port, an outlet port, and an inner bore being in communication with the inlet port and the outlet port, a piston provided at the inner bore of the pump housing and assembled with an annular sealing member to form a pump chamber in the inner bore, the piston reciprocating in an axial direction to increase and decrease a volume of the pump chamber, an inlet valve provided at an inlet passage communicating the inlet port and the pump chamber, the inlet valve opening when the volume of the pump chamber is increased and closing when the volume of the pump chamber is decreased, and an outlet valve provided at an outlet passage communicating the outlet port and the pump chamber, the outlet valve opening when the volume of the pump chamber is decreased and closing when the volume of the pump chamber is increased. A fluid flows from the inlet port into the outlet port by the increase and decrease of the volume of the pump chamber in response to the reciprocation of the piston in the axial direction. The piston is configured to slide at an inner wall of the inner bore. The annular sealing member is assembled with the piston so as to slide at the inner wall of the inner bore in the axial direction together with the piston. And a first sliding range of the piston relative to the inner wall of the inner bore and a second sliding range of the annular sealing member relative to the inner wall of the inner bore do not overlap each other in the axial direction.

According to another aspect of the present invention, a piston pump includes a pump housing including an inlet port, an outlet port, and an inner bore being in communication with the inlet port and the outlet port, a piston provided at the inner bore of the pump housing and assembled with an annular sealing member to form a pump chamber in the inner bore, the piston reciprocating in an axial direction to increase and decrease a volume of the pump chamber, an inlet valve provided at an inlet passage communicating the inlet port and the pump chamber, the inlet valve opening when the volume of the pump chamber is increased and closing when the volume of the pump chamber is decreased, and an outlet valve provided at an outlet passage communicating the outlet port and the pump chamber, the outlet valve opening when the volume of the pump chamber is decreased and closing when the volume of the pump chamber is increased. A fluid flows from the inlet port into the outlet port by the increase and decrease of the volume of the pump chamber in response to the reciprocation of the piston in the axial direction. The piston is configured to slide at an inner wall of the inner bore. The annular sealing member is assembled with the piston so as to slide at the inner wall of the inner bore in the axial direction together with the piston. And a first sliding range of the piston relative to the inner wall of the inner bore overlaps with a part of a second sliding range of the annular sealing member relative to the inner wall of the inner bore in an axial direction and the first sliding range of the piston relative to the inner wall of the inner bore does not overlap with the other portion of the second sliding range of the annular sealing member relative to the inner wall of the inner bore.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
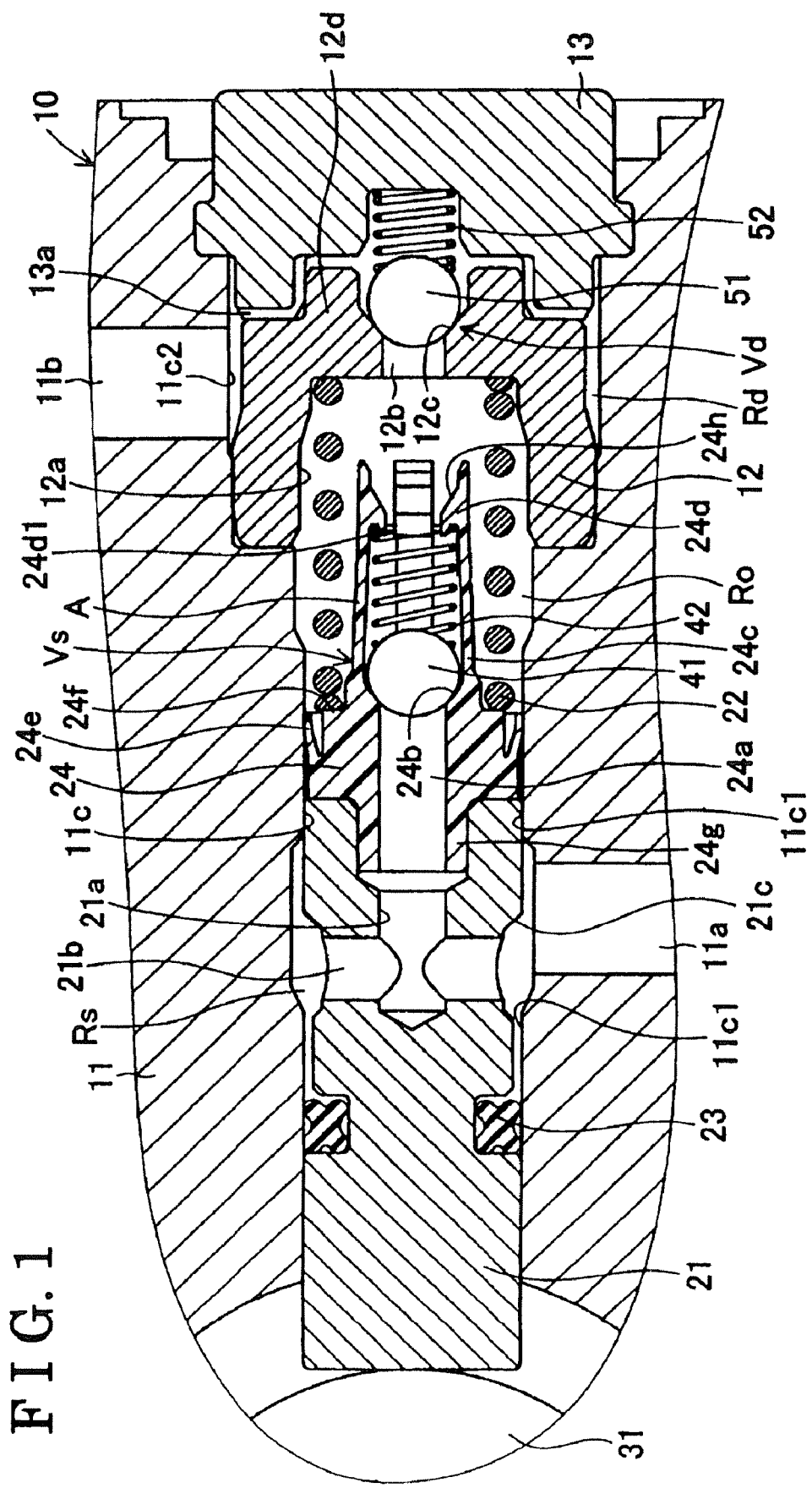
FIG. 1 is a cross-sectional view of a piston pump according to a first embodiment of the present invention.

Embodiments of the present invention will be explained with reference to illustrations of the drawing figures as follows.

A first embodiment will be explained referring to FIGS. 1-2. According to the first embodiment of the present invention, as shown in FIG. 1, a piston pump includes a pump housing 10, which includes a housing body 11, a cylinder member 12 and a cap 13. The cylinder member 12 and the cap 13 are assembled to the housing body 11. The housing body 11 includes an inlet port 11a, an outlet port 11b, and a stepped inner bore 11c which is in communication with the inlet port 11a and the outlet port 11b. A piston 21, an inlet valve Vs, and a piston return spring 22 are assembled within a small-diameter inner bore 11c1 of the stepped inner bore 11c.

The cylinder member 12 is assembled within a large-diameter inner bore 11c2 of the stepped inner bore 11c, together with the cap 13 and an outlet valve Vd. The cylinder member 12 forms an annular outlet chamber Rd which is directly in communication with the outlet port 11b and is in communication with a pump chamber Ro through the outlet valve Vd. Further, the cylinder member 12 is a cylindrically formed member having a bottom, which includes a cylinder hole 12a and a bottom wall 12d on which a first valve hole 12b of the outlet valve Vd and a valve seat 12c are formed. The cap 13 serves as a stopper for the cylinder member 12 not to fall out. The cap 13 is assembled to the housing body 11 in a liquid-tight manner and includes a groove 13a formed thereon where the cap 13 is in contact with the cylinder member 12 to establish the communication between the outlet chamber Rd and an outlet side of the outlet valve Vd.

The piston 21 is fitted within the small-diameter inner bore 11c1 of the stepped inner bore 11c of the housing body 11, by means of a seal ring 23, for example, made of rubber and a retainer 24, for example, made of resin in the liquid-tight manner so as to slide in the axial direction. The piston 21 forms the pump chamber Ro within the small-diameter inner bore 11c1 of the stepped inner bore 11c and the cylinder hole 12a. The piston 21 further forms an annular inlet chamber Rs, which is in communication with the pump chamber Ro through the inlet valve Vs and is directly in communication with the inlet port 11a, within the small-diameter inner bore 11c1 of the stepped inner bore 11c. Moreover, as shown at leftmost side in FIG. 1, the piston 21 is slidably engaged with an outer peripheral surface of an eccentric rotor 31 which is rotatably-driven by an electric motor. The piston 21 is configured to decrease a volume of the pump chamber Ro when the piston 21 is pushed forward in an axial direction in response to the rotation of the eccentric rotor 31 against a biasing force of the piston return spring 22. In contrast, when the piston 21 moves backward in the axial direction by the biasing force of the piston return spring 22, the volume of the pump chamber Ro increases.

Further, a first communication hole 21a which extends in an axial direction and a second communication hole 21b which extends in a radial direction are formed on the piston 21. An annular groove 21c which is in correspondence with the communication hole 21b is formed at the piston 21. The first communication hole 21a is in communication with a second valve hole 24a which is formed in the retainer 24 for the inlet valve Vs. The second communication hole 21b is formed at an intermediate portion of the piston 21 and a middle portion of the second communication hole 21b is in communication with an end portion of the first communication hole 21a. Further, the second communication hole 21b is in communication with the annular groove 21c at both ends thereof. The annular groove 21c is in communication with the inlet chamber Rs.

The piston return spring 22 is a compressed coil spring. The piston return spring 22 is provided between the cylinder member 12 and the retainer 24 which is assembled to the piston 21 with a predetermined pre-load so that the piston return spring 22 biases the piston 21, the retainer 24, and other members towards the eccentric rotor 31.

The inlet valve Vs is integrally assembled to a pump chamber side end portion of the piston 21 in a liquid-tight manner and is provided at an inlet passage, which establishes the communication between the inlet port 11a and the pump chamber Ro. Further, the inlet valve Vs includes a first ball valve body 41 and a first spring 42. The first ball valve body 41 is provided to seat and unseat from a first valve seat portion 24b which is formed on the retainer 24. The first spring 42 is provided between the retainer 24 and the first ball valve body 41 so as to bias the first ball valve body 41 toward the first valve seat portion 24b with a minor load. The inlet valve Vs is configured to open when the volume of the pump chamber Ro is increased and to close when the volume of the pump chamber Ro is decreased.

The retainer 24 is assembled at the piston 21 to form the pump chamber Ro within the small-diameter inner bore 11c1 of the stepped inner bore 11c. The retainer 24 serves as an annular sealing member, while serving as an element of the inlet valve Vs. Further, the retainer 24 includes the second valve hole 24a, the first valve seat portion 24b, a valve body retentive portion 24c, a spring retentive portion 24d, an annular sealing member portion 24e (i.e., serving as a sealing member), and an annular receiving portion 24f. The valve hole 24a is in communication with the inlet port 11a. The first valve seat portion 24b is formed at a pump chamber side end portion of the valve hole 24a. The valve body retentive portion 24c is integrally and continuously formed to the valve seat portion 24b. A cylindrical portion 24g provided at a left end of the retainer 24 in FIG. 1 is integrally and liquid-tightly fitted to the first communication hole 21a of the piston 21.

The valve body retentive portion 24c and the spring retentive portion 24d are structured by plural columnar bodies A. A left end portion of each of the columnar bodies A in FIG. 1 serves as the valve body retentive portion 24c, and a right end portion of each of the columnar bodies A in FIG. 1 serves as the spring retentive portion 24d. A latching portion (i.e. hook portion) 24d1 is formed at the right end portion of the each columnar body A in FIG. 1 serving as the spring retentive portion 24d. The latching portion 24d1 is engaged with an end portion of the first spring 42 to prevent the first spring 42 from falling out (i.e. slipping off) of the retainer 24. A tapered portion 24h tapered having a larger inner diameter at the pump chamber side is formed at right hand side portion of an inner periphery of each of the columnar bodies A, that is, at an inner periphery of the pump chamber side end portion of the retainer 24.

The annular sealing member portion 24e is integrally formed at an outer periphery of the retainer 24. As shown in FIG. 2, the annular sealing member portion 24e includes an annular lip groove 24e1 and an annular seal lip 24e2. The annular lip groove 24e1 is configured to open to the pump chamber Ro and is formed along in an axial direction. The annular seal lip 24e2 has a free end formed by the lip groove 24e1 at a pump chamber Ro side and a portion of the outer periphery surface of the annular seal lip 24e2 is slidable on the small-diameter inner bore 11c. The annular lip groove 24e1 and the annular seal lip 24e2 are formed to prevent a liquid from flowing out of the pump chamber Ro to the outer periphery of the piston 21. The annular receiving portion 24f is integrally formed at the outer periphery portion of the retainer 24 to protrude in the axial direction towards the pump chamber Ro relative to the sealing member portion 24e. With this construction, the annular receiving portion 24f can receive and support the piston return spring 22 which moves the piston 21 to return.

The first ball valve body 41 is preassembled to the retainer 24 from the right hand side in FIG. 1 to be housed and supported within the valve body retentive portion 24c of the retainer 24 and can be seated on and unseated from the first valve seat portion 24b. The first spring 42 is assembled to the retainer 24 together with the first ball valve body 41 at the same time from the right hand side in FIG. 1. The first spring 42 is housed and supported within the spring retentive portion 24d of the retainer 24 to bias the first ball valve body 41 toward the first valve seat portion 24b with the minor load. The first spring 42 may be assembled to the retainer 24 after the first ball valve body 41 has been assembled to the retainer 24.

The outlet valve Vd is provided at an outlet side end portion of the cylinder member 12, that is, the outlet side of the pump chamber Ro, and is provided at an outlet passage which connects the outlet port 11b and the pump chamber Ro. Further, the outlet valve Vd includes a second ball valve body 51 and a second spring 52. The second ball valve body 51 is seated on and unseated from a second valve seat portion 12c which is formed at the bottom wall 12d of the cylinder member 12. The second spring 52 is provided between the second ball valve body 51 and the cap 13 to bias the second ball valve body 51 toward the second valve seat portion 12c with the minor load. The outlet valve Vd is configured to close when the volume of the pump chamber Ro is increased and to open when the volume of the pump chamber Ro is decreased.

With the construction of the piston pump according to the first embodiment of the present invention, by the cooperation of the eccentric rotor 31 with the piston return spring 22 in response to the rotation of the eccentric rotor 31 driven by the electric motor, the piston 21 reciprocates in the axial direction. In response to the reciprocation of the piston 21, the volume of the pump chamber Ro is increased or decreased. In those circumstances, the inlet valve Vs and outlet valve Vd are respectively operated so that the liquid flows from the inlet port 11a into the outlet port 11b.

Figure 2A:
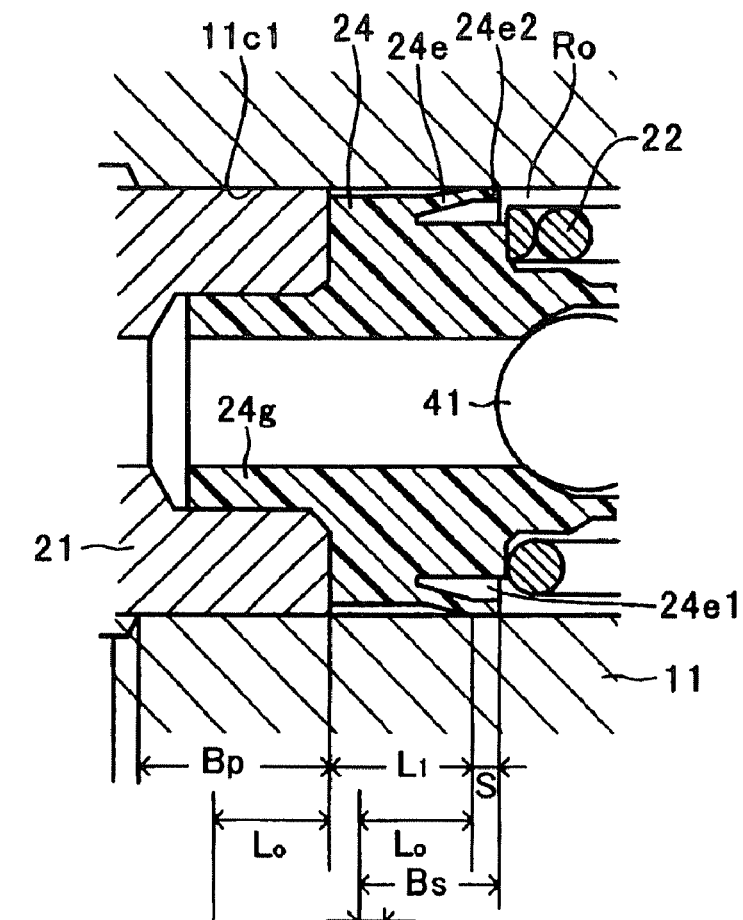
FIG. 2A is an explanatory view for an operation showing a state where a piston and a retainer of the piston pump (shown in FIG. 1) are at a most advanced end position.
Figure 2B:
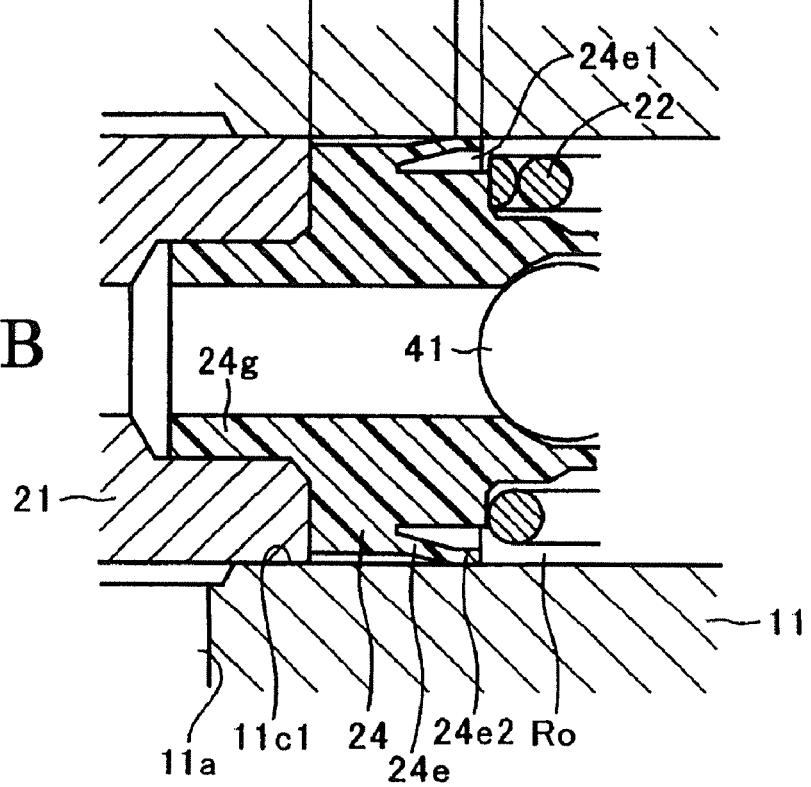
FIG. 2B is an explanatory view for an operation showing a state where the piston and the retainer of the piston pump (shown in FIG. 1) are at a most returned end portion.

According to the piston pump of the first embodiment, as shown in FIG. 2, a first sliding range Bp of the piston 21 relative to the inner wall of the small-diameter inner bore 11c1 and a second sliding range Bs of the annular sealing member portion 24e relative to the inner wall of the small-diameter inner bore 11c are defined not to overlap each other. Further, the piston 21 is slidably fitted to the inner wall of the small-diameter inner bore 11c1 at an outer periphery of a pump chamber side end portion thereof, and the retainer 24 having the sealing member portion 24e is integrally assembled at the pump chamber side end portion of the piston 21. An outside diameter of the piston side end portion of the sealing member portion 24e is determined to be smaller than an outside diameter of the pump chamber side end portion of the piston 21 by a predetermined length. A length L1 of the small-diameter portion of the sealing member portion 24e in an axial direction is determined to be equal to or longer than a length Lo corresponding to a range of reciprocation (i.e. slide stroke) of the piston 21.

Accordingly, even when scratches are formed on the inner wall of the small-diameter inner bore 11c1 in response to the sliding movement of the piston 21 on the inner wall of the small-diameter inner bore 11c1, a sliding portion (i.e., serving as a sealing portion) S of the seal lip 24e2 provided at the sealing member portion 24e does not slide on the scratches. In consequence, the sliding portion S of the sealing member portion 24e will not be damaged due to the scratches produced on the inner wall of the small-diameter inner bore 11c1 by the piston 21, and the durability of the sealing member portion 24e can be improved. Further, because of the foregoing configurations of the piston 21 and the retainer 24, the small-diameter portion of the sealing member portion 24e at the piston side does not slide on the inner wall of the small-diameter inner bore 11c1, and thus the resistance generated upon the sliding does not fluctuate at the small-diameter portion. In addition, the sliding portion S of the seal lip 24e2 provided at the sealing member portion 24e slides on the inner wall of the small-diameter inner bore 11c1 at the pump chamber side having a distance from the pump chamber side end portion of the piston 21, the distance which is equal to or further than the length Lo which is the range of reciprocation (i.e. slide stroke) of the piston 21. Accordingly, a behavior of the piston 21 when sliding can be stabilized, and the abrasion of the retainer 24 other than the sliding portion S of the sealing member potion 24e can be prevented.

According to the first embodiment, the sealing member portion 24e (i.e. sealing member), which is assembled within the small-diameter inner bore 11c1 (i.e. the inner bore of the pump housing) together with the piston 21 to form the pump chamber Ro, is integrally formed on the retainer 24. However, the sealing member can also be separately provided from the retainer 24. In those circumstances, an annular groove may be provided at an outer periphery of the pump chamber side end portion of the piston so that the sealing member is assembled to the annular groove, and an outer peripheral portion of the sealing member is fitted to the inner bore of the pump housing so as to be slidable in an axial direction. Further, according to the first embodiment, the seal lip is applied as the sealing member. However, the configuration of the sealing member can be changed in an appropriate manner, and the structure of the sealing member is not limited to the shape described in the first embodiment.

Figure 3:
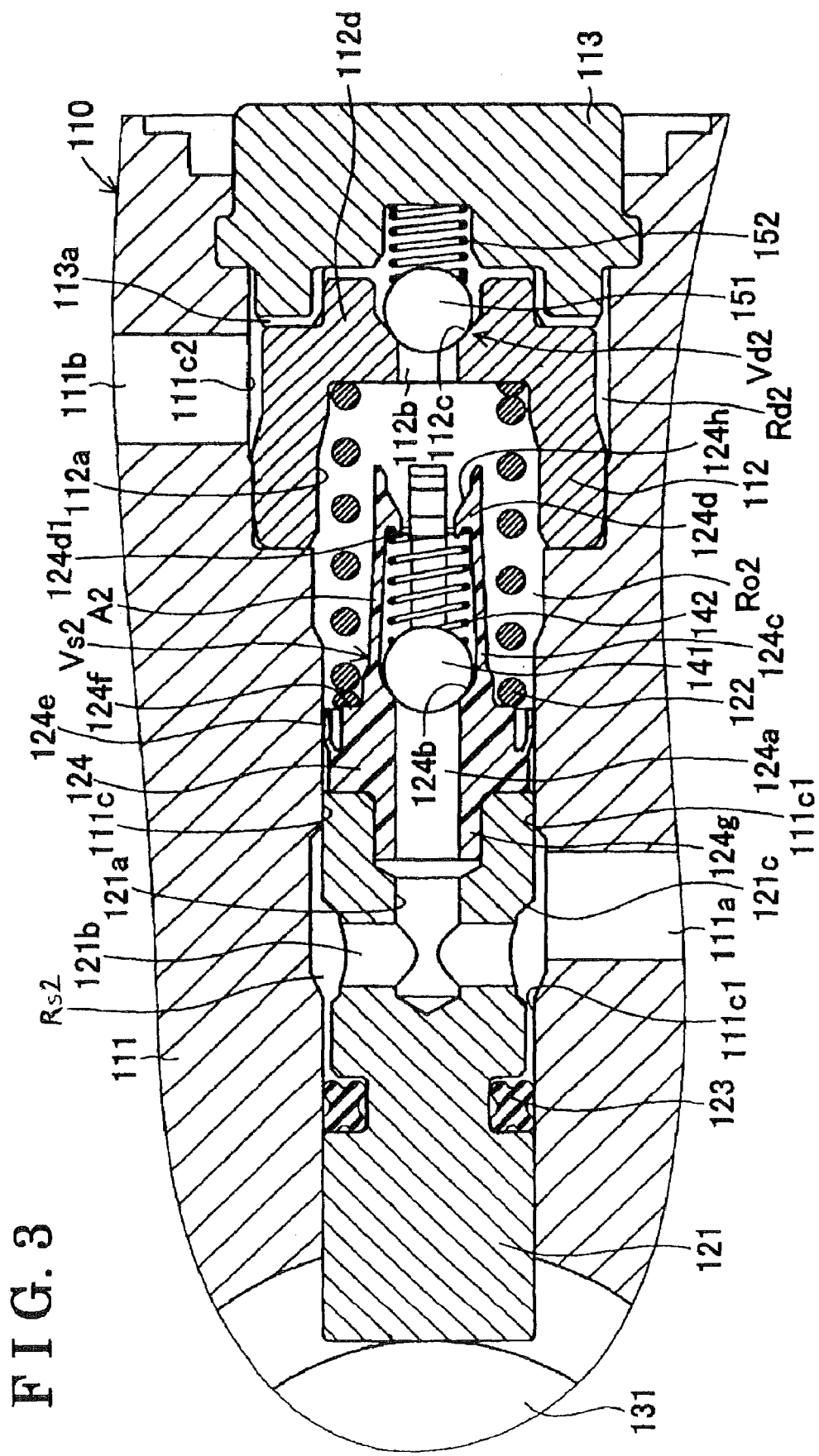
FIG. 3 is a cross-sectional view of a piston pump according to a second embodiment of the present invention.

A second embodiment will be explained referring to FIGS. 3-4. According to the second embodiment of the present invention, as shown in FIG. 3, a piston pump includes a pump housing 110, which includes a housing body 111, a cylinder member 112 and a cap 113. The cylinder member 112 and the cap 113 are assembled to the housing body 111. The housing body 111 includes an inlet port 111a, an outlet port 111b, and a stepped inner bore 111c which is in communication with the inlet port 111a and the outlet port 111b. A piston 121, an inlet valve Vs2, and a piston return spring 122 are assembled within a small-diameter inner bore 11c1 of the stepped inner bore 111c.

The cylinder member 112 is assembled within a large-diameter inner bore 111c2 of the stepped inner bore 111c, together with the cap 113 and an outlet valve Vd2. The cylinder member 112 forms an annular outlet chamber Rd2 which is directly in communication with the outlet port 111b and is in communication with a pump chamber Ro2 through the outlet valve Vd2. Further, the cylinder member 112 is a cylindrically formed member having a bottom, which includes a cylinder hole 112a and a bottom wall 112d on which a first valve hole 112b of the outlet valve Vd2 and a valve seat 112c are formed. The cap 113 serves as a stopper for the cylinder member 112 not to fall out. The cap 113 is assembled to the housing body 111 in a liquid-tight manner and includes a groove 113a formed thereon where the cap 113 is in contact with the cylinder member 112 to establish the communication between the outlet chamber Rd2 and an outlet side of the outlet valve Vd2.

The piston 121 is fitted within the small-diameter inner bore 111c1 of the stepped inner bore 111c of the housing body 111, by means of a seal ring 123, for example, made of rubber and a retainer 124, for example, made of resin in the liquid-tight manner so as to slide in the axial direction. The piston 121 forms the pump chamber Ro2 within the small-diameter inner bore 111c1 of the stepped inner bore 111c and the cylinder hole 112a. The piston 121 further forms an annular inlet chamber Rs2, which is in communication with the pump chamber Ro2 through the inlet valve Vs2 and is directly in communication with the inlet port 11a, within the small-diameter inner bore 111c1 of the stepped inner bore 111c. Moreover, as shown at leftmost side in FIG. 3, the piston 121 is slidably engaged with an outer peripheral surface of an eccentric rotor 131 which is rotatably-driven by an electric motor. The piston 121 is configured to decrease a volume of the pump chamber Ro2 when the piston 121 is pushed forward in an axial direction in response to the rotation of the eccentric rotor 131 against a biasing force of the piston return spring 122. In contrast, when the piston 121 moves backward in the axial direction by the biasing force of the piston return spring 122, the volume of the pump chamber Ro2 increases.

Further, a first communication hole 121a which extends in an axial direction and a second communication hole 121b which extends in a radial direction are formed on the piston 121. An annular groove 121c which is in correspondence with the communication hole 121b is formed at the piston 121. The first communication hole 121a is in communication with a second valve hole 124a which is formed in the retainer 124 for the inlet valve Vs2. The second communication hole 121b is formed at an intermediate portion of the piston 121 and a middle portion of the second communication hole 121b is in communication with an end portion of the first communication hole 121a. Further, the second communication hole 121b is in communication with the annular groove 121c at both ends thereof. The annular groove 121c is in communication with the inlet chamber Rs2.

The piston return spring 122 is a compressed coil spring. The piston return spring 122 is provided between the cylinder member 112 and the retainer 124 which is assembled to the piston 121 with a predetermined pre-load so that the piston return spring 122 biases the piston 121, the retainer 124, and other members towards the eccentric rotor 131.

The inlet valve Vs2 is integrally assembled to a pump chamber side end portion of the piston 121 in a liquid-tight manner and is provided at an inlet passage, which establishes the communication between the inlet port 111a and the pump chamber Ro2. Further, the inlet valve Vs2 includes a first ball valve body 141 and a first spring 142. The first ball valve body 141 is provided to seat and unseat from a first valve seat portion 124b which is formed on the retainer 124. The first spring 142 is provided between the retainer 124 and the first ball valve body 141 so as to bias the first ball valve body 141 toward the first valve seat portion 124b with a minor load. The inlet valve Vs2 is configured to open when the volume of the pump chamber Ro2 is increased and to close when the volume of the pump chamber Ro2 is decreased.

The retainer 124 is assembled at the piston 121 to form the pump chamber Ro2 within the small-diameter inner bore 111c1 of the stepped inner bore 111c. The retainer 124 serves as an annular sealing member, while serving as an element of the inlet valve Vs2. Further, the retainer 124 includes the second valve hole 124a, the first valve seat portion 124b, a valve body retentive portion 124c, a spring retentive portion 124d, an annular sealing member portion 124e (i.e., serving as a sealing member), and an annular receiving portion 124f. The valve hole 124a is in communication with the inlet port 111a. The first valve seat portion 124b is formed at a pump chamber side end portion of the valve hole 124a. The valve body retentive portion 124c is integrally and continuously formed to the valve seat portion 124b. A cylindrical portion 124g provided at a left end of the retainer 124 in FIG. 3 is integrally and liquid-tightly fitted to the first communication hole 121a of the piston 121.

The valve body retentive portion 124c and the spring retentive portion 124d are structured by plural columnar bodies A2. A left end portion of each of the columnar bodies A2 in FIG. 3 serves as the valve body retentive portion 124c, and a right end portion of each of the columnar bodies A2 in FIG. 3 serves as the spring retentive portion 124d. A latching portion (i.e. hook portion) 124d1 is formed at the right end portion of the each columnar body A2 in FIG. 3 serving as the spring retentive portion 124d. The latching portion 124d1 is engaged with an end portion of the first spring 142 to prevent the first spring 142 from falling out (i.e. slipping off) of the retainer 124. A tapered portion 124h tapered having a larger inner diameter at the pump chamber side is formed at right hand side portion of an inner periphery of each of the columnar bodies A2, that is, at an inner periphery of the pump chamber side end portion of the retainer 124.

The annular sealing member portion 124e is integrally formed at an outer periphery of the retainer 124. As shown in FIG. 4, the annular sealing member portion 124e includes an annular lip groove 124e1 and an annular seal lip 124e2. The annular lip groove 124e1 is configured to open to the pump chamber Ro2 and is formed along in an axial direction. The annular seal lip 124e2 has a free end formed by the lip groove 124e1 at a pump chamber Ro2 side and a portion of the outer periphery surface of the annular seal lip 124e2 is slidable on the small-diameter inner bore 111c1. The annular lip groove 124e1 and the annular seal lip 124e2 are formed to prevent a liquid from flowing out of the pump chamber Ro2 to the outer periphery of the piston 121. The annular receiving portion 124f is integrally formed at the outer periphery portion of the retainer 124 to protrude in the axial direction towards the pump chamber Ro2 relative to the sealing member portion 124e. With this construction, the annular receiving portion 124*f* can receive and support the piston return spring 122 which moves the piston 121 to return.

The first ball valve body 141 is preassembled to the retainer 124 from the right hand side in FIG. 3 to be housed and supported within the valve body retentive portion 124*c* of the retainer 124 and can be seated on and unseated from the first valve seat portion 124*b*. The first spring 142 is assembled to the retainer 124 together with the first ball valve body 141 at the same time from the right hand side in FIG. 3. The first spring 142 is housed and supported within the spring retentive portion 124*d* of the retainer 124 to bias the first ball valve body 141 toward the first valve seat portion 124*b* with the minor load. The first spring 142 may be assembled to the retainer 124 after the first ball valve body 141 has been assembled to the retainer 124.

The outlet valve Vd2 is provided at an outlet side end portion of the cylinder member 112, that is, the outlet side of the pump chamber Ro2, and is provided at an outlet passage which connects the outlet port 111*b* and the pump chamber Ro2. Further, the outlet valve Vd2 includes a second ball valve body 151 and a second spring 152. The second ball valve body 151 is seated on and unseated from a second valve seat portion 112*c* which is formed at the bottom wall 112*d* of the cylinder member 112. The second spring 152 is provided between the second ball valve body 151 and the cap 113 to bias the second ball valve body 151 toward the second valve seat portion 112*c* with the minor load. The outlet valve Vd2 is configured to close when the volume of the pump chamber Ro2 is increased and to open when the volume of the pump chamber Ro2 is decreased.

With the construction of the piston pump according to the second embodiment of the present invention, by the cooperation of the eccentric rotor 131 with the piston return spring 122 in response to the rotation of the eccentric rotor 131 driven by the electric motor, the piston 121 reciprocates in the axial direction. In response to the reciprocation of the piston 121, the volume of the pump chamber Ro2 is increased or decreased. In those circumstances, the inlet valve Vs2 and outlet valve Vd2 are respectively operated so that the liquid flows from the inlet port 111*a* into the outlet port 111*b*.

Figure 4A:
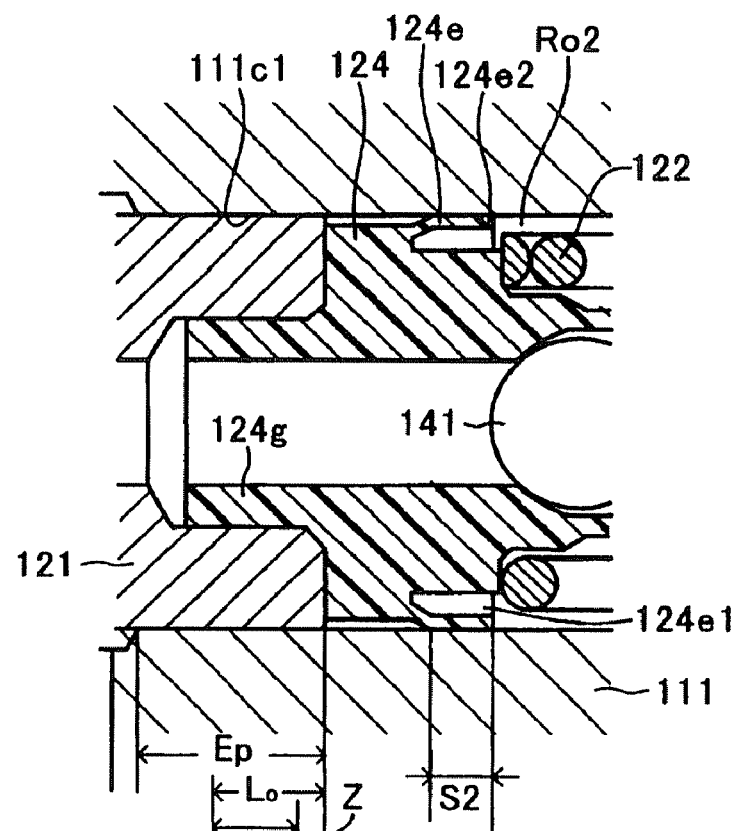
FIG. 4A is an explanatory view for an operation showing a state where a piston and a retainer of the piston pump (shown in FIG. 3) are at a most advanced end position.
Figure 4B:
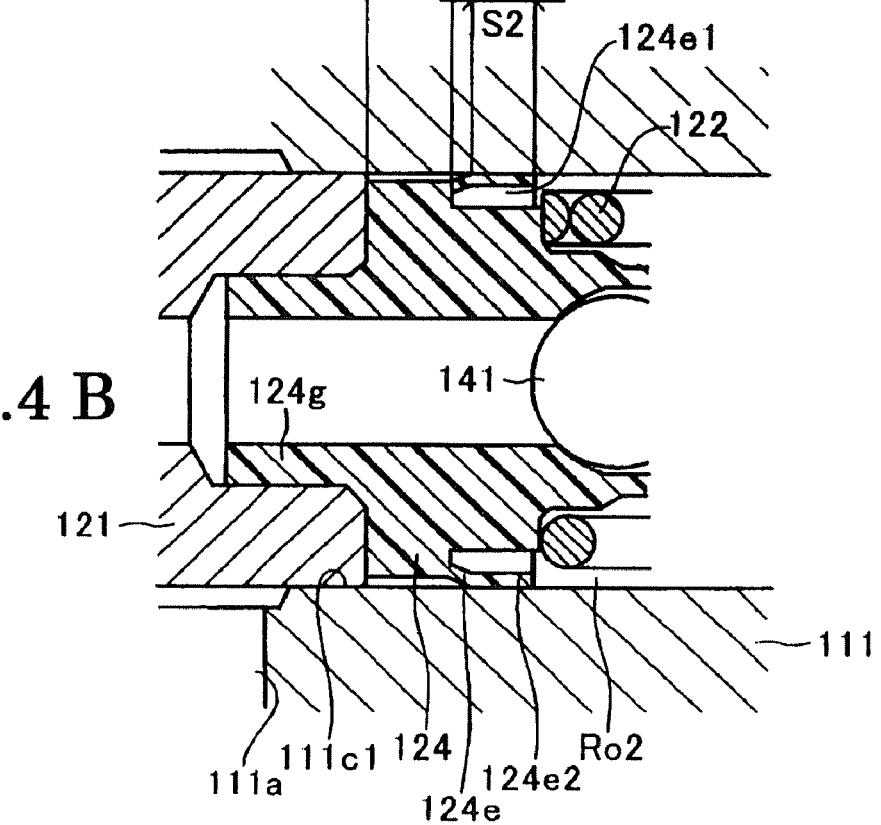
FIG. 4B is an explanatory view for an operation showing a state where the piston and the retainer of the piston pump (shown in FIG. 3) are at a most returned end portion.

According to the second embodiment of the present invention, as shown in FIG. 4, a sliding range Ep of the piston 121 relative to the inner wall of the small-diameter inner bore 111*c*1 is defined not to overlap with a sliding range Es of the seal lip 124*e*2 relative to the inner wall of the small-diameter inner bore 111*c*1 in an axial direction other than a range Z in the sliding range Es provided at the piston side (i.e., the sliding range Es and the sliding range Ep overlaps each other only within the range Z). In other words, the other portion of the sliding range Es of the seal lip 124*e*2 (i.e., remaining range Es-Z provided at the opposite side of the piston) does not overlap with the sliding range Ep of the piston 121.

Accordingly, even when scratches are formed on the inner wall of the small-diameter inner bore 111*c*1 in response to the sliding movement of the piston 121, the entire portion of a seal portion S2 of the seal lip 124*e*2 (i.e., a portion which slidably engages with the inner wall of the small-diameter inner bore 111*c*1 to contribute for sealing) does not slide on the scratches. In consequence, sealing function of the seal lip 124*e*2 is not impaired early.

Further, according to the second embodiment, the piston pump includes the annular seal lip 124*e*2 which is slidable on the inner wall of the small-diameter inner bore 111*c*1 at the outer periphery surface thereof. The annular lip groove 124*e*1 which is open to the pump chamber Ro2 and formed along in the axial direction is provided at the sealing member portion 124*e* so that the annular seal lip 124*e*2 has the free end at the pump chamber Ro2 side. A length Lr in an axial direction from an end of the piston 121 at the pump chamber side which is slidable on the inner wall of the small-diameter inner bore 111*c*1 to a bottom of the lip groove 124*e*1 is defined to be shorter than the length Lo which is a range of reciprocation (i.e. slide stroke) of the piston 21.

Thus, the lip groove 124*e*1 is provided at an inner periphery of a seal portion (i.e., S2-Z) of the seal lip 124*e*2 which does not slide on the scratches. With this construction, compared to the construction in which a lip groove is not formed on a seal member corresponding to the sealing member portion 124*e*, pressure applied to the seal lip 124*e*2 relative to the inner wall of the small-diameter inner bore 111*c*1 can be reduced, and a degree of the resistance between the seal lip 124*e*2 and the housing body 111 caused by the slide of the seal lip 124*e*2 can be securely reduced.

According to the second embodiment of the present invention, only the outer periphery of the seal lip 124*e*2 is slidably engaged with the inner wall of the small-diameter inner bore 111*c*1. However, the construction may be changed so that an outer periphery of the retainer 124 which is continuously formed from the outer periphery of the seal lip 124*e*2 is slidably engaged with the inner wall of the small-diameter inner bore 111*c*1.

According to the embodiments of the present invention, the cylinder member 12, 112 is formed relatively short, and the end portion of the piston 21, 121 at the pump chamber side and the sealing member portion 24*e*, 124*e* (i.e., sealing member) are assembled within the small-diameter inner bore 11*c*1, 111*c*1 of the housing body 11, 111 so as to slide in the axial direction. However, a cylinder member may be formed relatively long in an axial direction extending to a vicinity of the inlet port 11*a*, 111*a*. In this modified example, the end portion of the piston 21, 121 at the pump chamber side and the sealing member portion 24*e*, 124*e* (i.e., sealing member) may be assembled within an inner bore formed on the cylinder member so as to slide in an axial direction.

Furthermore, according to the embodiments of the present invention, a general piston pump is applied as the piston pump. However, a self-suction pump may also be applied as the piston pump.

According to disclosed subject matter of the piston pump, the sliding range of the piston relative to the inner wall of the inner bore is arranged not to overlap with the sliding range of the sealing member relative to the inner wall of the inner bore in the axial direction. In those circumstances, the outer periphery of the piston at the pump chamber side end portion is slidably fitted to the inner wall of the inner bore, and the annular sealing member is integrally assembled to the pump chamber side end portion of the piston. An outside diameter of the piston side end portion of the annular sealing member is determined to be smaller than an outside diameter of the pump chamber side end portion of the annular sealing member by a predetermined length. In the meantime, an axial length of the small-diameter piston side end portion of the annular sealing member can also be determined to be equal to or longer than a distance of reciprocation (i.e. slide stroke) of the piston.

According to disclosed subject matter of the piston pump, because the sliding range of the piston relative to the inner wall of the inner bore is defined not to overlap with the sliding range of the sealing member relative to the inner wall of the inner bore in the axial direction, even when the scratch has produced on the inner wall of the inner bore in response to the sliding movement of the piston, the sliding portion of the annular sealing member will not slide on the scratch. Accordingly, the sliding portion of the annular sealing member will not be damaged by the scratch formed on the inner wall of the inner bore, and thus the durability of the annular sealing member can be secured.

According to the embodiment, in a condition where the piston is slidably fitted to the outer periphery of the pump chamber side end portion of the inner wall of the inner bore, the annular sealing member is integrally assembled to the pump chamber side end portion of the piston, the outside diameter of the piston side end portion of the annular sealing member is determined to be smaller than the outside diameter of the pump chamber side end portion of the annular sealing member by the predetermined length, and the length of the small-diameter piston side end portion of the annular sealing member in the axial direction is determined to be equal to or longer than the range of the reciprocation of the piston in the axial direction(i.e. slide stroke), in addition to the foregoing advantages, a behavior of the piston when sliding can be stabilized and the abrasion of the sealing member other than the sliding portion can be prevented. This is because the degree of the resistance caused by the sliding movement of members does not fluctuate because the small-diameter portion of the sealing member does not slide on the inner wall of the inner bore, and also the sliding portion of the sealing member slides on the inner wall of the inner bore at the pump chamber side which is away from the pump chamber side end portion of the piston by equal to or further than the distance of the reciprocation of the piston (i.e., slide stroke).

According to disclosed subject matter of the piston pump, the sliding range of the piston is partially overlapped with the sliding range of the sealing member at the piston side and remaining range of the sliding range of the piston does not overlap with the sliding range of the sealing member (i.e., the sliding range of the piston overlaps with only a part of the sliding range of the sealing member at the piston side). In other words, the remaining portion of the sliding range of the sealing member (i.e., the remaining portion of the sliding range of the sealing member at the opposite side of the piston) does not overlap with the sliding range of the piston. Accordingly, even when the scratches are formed on the inner wall of the inner bore in response to the sliding movement of the piston, not the entire sealing portion of the sealing member (i.e., the portion which functions for sealing by slidably engaging with the inner wall of the inner bore) slide on the scratches, and thus the sealing function of the sealing member is not damaged early.

According to disclosed subject matter of the piston pump, the lip groove is formed at the inner periphery of the seal lip of the sealing portion which does not slide on the scratches formed by the sliding movement of the piston. Compared to the construction in which the sealing member does not include the lip groove, with the foregoing construction, the pressure applied to the sealing lip relative to the inner wall of the inner bore can be reduced to securely reduce the resistance caused by the sliding movement between the seal lip and the pump housing.

The piston pump according to the embodiment of the present invention may be, for example, applied as a hydraulic pump for a braking apparatus for a vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A piston pump, comprising:
a pump housing including an inlet port, an outlet port, and an inner bore being in communication with the inlet port and the outlet port;
a piston provided at the inner bore of the pump housing and assembled with an annular sealing member to form a pump chamber in the inner bore, the piston reciprocating in an axial direction to increase and decrease a volume of the pump chamber;
an inlet valve provided at an inlet passage communicating the inlet port and the pump chamber, the inlet valve opening when the volume of the pump chamber is increased and closing when the volume of the pump chamber is decreased; and
an outlet valve provided at an outlet passage communicating the outlet port and the pump chamber, the outlet valve opening when the volume of the pump chamber is decreased and closing when the volume of the pump chamber is increased; wherein
a fluid flows from the inlet port into the outlet port by the increase and decrease of the volume of the pump chamber in response to the reciprocation of the piston in the axial direction;
the piston is configured to slide at an inner wall of the inner bore;
the annular sealing member is assembled with the piston so as to slide at the inner wall of the inner bore in the axial direction together with the piston;
a sliding range of the piston relative to the inner wall of the inner bore does not overlap in the axial direction with a sliding range of the annular sealing member relative to the inner wall of the inner bore;
an outer periphery of a pump chamber side end portion of the piston is slidably fitted to the inner wall of the inner bore;
the annular sealing member is integrally assembled to the pump chamber side end portion of the piston;
an outside diameter of a piston side end portion of the annular sealing member is defined to be smaller than an outside diameter of a pump chamber side end portion of the annular sealing member by a predetermined length; and
axial length of the piston side end portion of the annular sealing member having the smaller diameter is defined to be equal to or longer than a range of reciprocation of the piston.

2. A piston pump, comprising:
a pump housing including an inlet port, an outlet port, and an inner bore being in communication with the inlet port and the outlet port;
a piston provided at the inner bore of the pump housing and assembled with an annular sealing member to form a pump chamber in the inner bore, the piston reciprocating in an axial direction to increase and decrease a volume of the pump chamber;
an inlet valve provided at an inlet passage communicating the inlet port and the pump chamber, the inlet valve opening when the volume of the pump chamber is increased and closing when the volume of the pump chamber is decreased; and
an outlet valve provided at an outlet passage communicating the outlet port and the pump chamber, the outlet valve opening when the volume of the pump chamber is decreased and closing when the volume of the pump chamber is increased; wherein a fluid flows from the inlet port into the outlet port by the increase and decrease of the volume of the pump chamber in response to the reciprocation of the piston in the axial direction;

the piston is configured to slide at an inner wall of the inner bore;

the annular sealing member is assembled with the piston so as to slide at the inner wall of the inner bore in the axial direction together with the piston;

a sliding range of the piston relative to the inner wall of the inner bore only partially overlaps in the axial direction with a sliding range of the annular sealing member relative to the inner wall of the inner bore;

the annular sealing member includes an annular lip groove opening to the pump chamber and formed along the axial direction;

an annular seal lip having a free end formed by the lip groove at the pump chamber side and a portion of an outer periphery surface of the seal lip slides at the inner wall of the inner bore; and an axial length from an end of the piston at the pump chamber side which is slidable at the inner wall of the inner bore to a bottom of the lip groove is defined to be shorter than an axial length of a range of reciprocation of the piston.

* * * * *